United States Patent
Ishikawa et al.

(10) Patent No.: US 7,974,603 B2
(45) Date of Patent: Jul. 5, 2011

(54) AUTHENTICATION VECTOR GENERATING DEVICE, SUBSCRIBER AUTHENTICATION MODULE, MOBILE COMMUNICATION SYSTEM, AND AUTHENTICATION VECTOR GENERATION METHOD

(75) Inventors: Hidetoshi Ishikawa, Yokohama (JP); Teruaki Shiro, Tokyo (JP); Hiroshi Umeno, Tokyo (JP)

(73) Assignees: NTT DoCoMo, Inc., Tokyo (JP); Dainippon Printing Co., Ltd., Tokyo (JP)

( * ) Notice: Subject to any disclaimer, the term of this patent is extended or adjusted under 35 U.S.C. 154(b) by 975 days.

(21) Appl. No.: 11/678,925

(22) Filed: Feb. 26, 2007

(65) Prior Publication Data

US 2007/0202848 A1 Aug. 30, 2007

(30) Foreign Application Priority Data

Feb. 27, 2006 (JP) ................ P2006-051025

(51) Int. Cl.
*H04M 3/16* (2006.01)
*H04M 11/00* (2006.01)
*H04L 29/06* (2006.01)
*H04L 9/32* (2006.01)

(52) U.S. Cl. ......... 455/411; 455/406; 713/168; 713/153

(58) Field of Classification Search .................. 455/406, 455/411; 713/169, 153, 155, 168; 370/328
See application file for complete search history.

(56) References Cited

U.S. PATENT DOCUMENTS

| 5,898,783 | A | 4/1999 | Rohrbach |
| 2006/0003738 | A1 | 1/2006 | Ishikawa |
| 2006/0046689 | A1* | 3/2006 | Kim .............................. 455/406 |
| 2006/0172723 | A1 | 8/2006 | Ishikawa |
| 2007/0101122 | A1* | 5/2007 | Guo .............................. 713/153 |

FOREIGN PATENT DOCUMENTS

| JP | 9-121387 | 5/1997 |
| JP | 2002-209260 | 7/2002 |
| JP | 2003-338875 | 11/2003 |
| JP | 2005-167463 | 6/2005 |
| JP | 2006-050523 | 2/2006 |

* cited by examiner

*Primary Examiner* — Charles N Appiah
*Assistant Examiner* — Kiet Doan
(74) *Attorney, Agent, or Firm* — Oblon, Spivak, McClelland, Maier & Neustadt, L.L.P.

(57) ABSTRACT

To stop functions of a subscriber authentication module regardless of whether a roaming network is based on IMT-2000 or GSM.

HLR of a mobile communication network based on IMT-2000 has a stop information addition part instructing a RAND field of an authentication vector used for authentication of USIM to cause part or all of functions in the subscriber authentication module to stop. The USIM mounted in a mobile terminal has a function stop part executing to cause part or all of functions of the subscriber authentication module to stop, an identification part that refers to information identifying stop information contained in received data and transmits the stop information to a function stop part, and an operation part for performing a predetermined operation using the received data.

7 Claims, 4 Drawing Sheets

AUTHENTICATION VECTOR GENERATING DEVICE, SUBSCRIBER AUTHENTICATION MODULE, MOBILE COMMUNICATION SYSTEM, AND AUTHENTICATION VECTOR GENERATION METHOD

BACKGROUND OF THE INVENTION

1. Field of the Invention

The present invention relates to an authentication vector generating device for causing functions of a subscriber authentication module to stop, the subscriber authentication module, a mobile communication system and an authentication vector generation method.

2. Related Background of the Invention

In recent years, public opinion about protection of personal information is on the rise such as establishment of laws relating to protection of personal information. Mobile communication businesses, on the other hand, have several dozens of millions of subscribers and are now quite familiar in everyday life.

A subscriber authentication module used and managed by a user in mobile communication and a mobile phone in which the subscriber authentication module is mounted are devices containing a lot of personal information and are carried by the user at normal times, and thus it is not rare that such devices become non-controllable by the user due to a loss or theft. If the subscriber authentication module or the mobile phone in which the subscriber authentication module is mounted is lost or stolen, stopping calls or communication using the subscriber authentication module can quickly be dealt with only by reporting to a mobile communication operator to which the subscriber of the mobile communication network subscribes or an issuer of subscriber authentication module (hereinafter, the mobile communication network provided as a service by the mobile communication operator or the issuer of subscriber authentication module is called a "home network").

However, utilization stop of communication lines using the subscriber authentication module means only that call connection by network equipment in a home network is not established and can not stop functions of the subscriber authentication module itself mounted in a mobile phone.

Here, as a mechanism to cause functions of a subscriber authentication module itself to stop, that is, to prevent utilization by a user other than a legitimate user, there is a function to authenticate a legitimate user of the subscriber authentication module by forcing input of PIN (Personal Identity Number) into the subscriber authentication module for verification. That is, authenticating a legitimate user of the subscriber authentication module by input of PIN by a user during power-on (that is, starting power supply to the subscriber authentication module) of a mobile terminal is considered.

As long as PIN is not known to third parties, the PIN of the subscriber authentication module cannot be made verified in the authentication function based on the PIN. Thus, for example, when the subscriber authentication module is inserted into another mobile phone and power supply to the subscriber authentication module is once cut, then it will be impossible to access internal information that requires PIN verification in the subscriber authentication module to which power is again supplied.

Patent Document 1 shown below relates to a function stop method of causing various functions of a mobile terminal unit to stop easily and reliably by a third party when the mobile terminal unit is stolen or lost and describes a method to cause various functions of the mobile terminal unit to stop by transmitting an e-mail to the stolen or lost mobile terminal unit.

[Patent Document 1] Japanese Patent Application Laid-Open No. 2002-209260

SUMMARY OF THE INVENTION

However, once legitimate information is input for PIN verification of a subscriber authentication module (hereinafter a verified state is assumed), thereafter the verified state will be maintained until the subscriber authentication module is turned off or reset (restarted). If a mobile phone in which a subscriber authentication module is mounted is lost, it is usually assumed that PIN of the subscriber authentication module was verified at least when a legitimate user managed the mobile phone.

Therefore, the PIN verified state of the subscriber authentication module can be maintained unless power supply is interrupted using a device (charger) conforming to the mobile phone after the mobile phone is taken back, and in this case, information stored in the subscriber authentication module can be accessed.

By inputting and setting the PIN, the legitimate user can also disable a PIN verification function itself for the subscriber authentication module in advance. That is, if the PIN verification function is disabled in the subscriber authentication module, it is quite easy to view internally stored information by removing the subscriber authentication module from the taken-back mobile phone to insert it into another mobile phone or connecting an IC card reader/writer to a personal computer.

Since the above-described method of Patent Document 1 requires an e-mail function, it is difficult to apply the method to all mobile terminal units. Further, if the mobile terminal is located at the place where no e-mail can be received, for example, no radio wave is received, the function cannot be executed and, even after moving to a place where radio waves can be received, the functions of the mobile terminal cannot be quickly caused to stop because an e-mail may not be received immediately.

Therefore, in order to solve the above problems, an object of the present invention is to provide an authentication vector generating device that can cause part or all of functions of a subscriber authentication module to stop quickly, the subscriber authentication module, a mobile communication system, and an authentication vector generation method.

An authentication vector generating device in the present invention is one for generating an authentication vector which includes a RAND field in response to a request from an authentication device for authenticating a subscriber authentication module and transmitting the generated authentication vector to the authentication device; and comprises: a setting unit for making a setting to an effect that part or all of functions of the subscriber authentication module mounted in a subscriber terminal equipment should be caused to stop based on settings of an operator operating the authentication vector generating device; a request accepting unit for accepting an issue request of an authentication vector for authenticating the subscriber authentication module via the subscriber terminal equipment; an authentication vector generating unit for generating an authentication vector for authenticating the subscriber authentication module mounted in the subscriber terminal equipment after an issue request of an authentication vector is accepted by the request accepting unit; an addition unit for adding stop information instructing to cause part or all of functions of the subscriber authentication module to stop to the RAND field of the authentication vector generated by the authentication vector generating unit when the setting unit makes a setting to the effect that the functions of the subscriber authentication module should be caused to stop; and an authentication vector transmitting unit for transmitting the authentication vector to which the stop information is added by the addition unit to the authentication device.

An authentication vector generation method in the present invention is a method of generating an authentication vector of an authentication vector generating device that generates an authentication vector including a RAND field in response to a request from an authentication device authenticating a subscriber authentication module and transmits the generated authentication vector to the authentication device; and the method comprises: a setting step of making a setting to an effect that part or all of functions of the subscriber authentication module mounted in the subscriber terminal equipment should be caused to stop based on settings of an operator operating the authentication vector generating device; an accepting step of accepting an issue request of an authentication vector from the authentication device for authenticating the subscriber authentication module via the subscriber terminal equipment set by the setting step; an authentication vector generating step of generating an authentication vector for authenticating the subscriber authentication module in the subscriber terminal equipment after a request of the authentication vector is accepted by the accepting step; an addition step of adding stop information instructing to cause part or all of functions of the subscriber authentication module to stop to the RAND field of the authentication vector generated by the authentication vector generating step when the setting step makes a setting to the effect that the functions of the subscriber authentication module should be caused to stop; and a transmitting step of transmitting the authentication vector to which the stop information is added by the addition step to the authentication device.

According to the present invention, if a setting is made to an effect that part or all of functions of a subscriber authentication module mounted in subscriber terminal equipment should be caused to stop based on settings of an operator operating an authentication vector generating device or a user of the subscriber terminal equipment and an issue request of an authentication vector from an authentication device whose location registration has been performed from the set subscriber terminal equipment is accepted, an authentication vector for authenticating the subscriber authentication module in the subscriber terminal equipment is generated. Then, if a setting is made to stop the functions of the subscriber authentication module, stop information instructing to cause part or all of functions of the subscriber authentication module to stop is added to the RAND field of the generated authentication vector so that the authentication vector to which the stop information is added can be transmitted to the authentication device.

An authentication vector for stopping functions is thereby generated in accordance with a location registration request from the subscriber terminal equipment such as a mobile terminal and, therefore, the functions can be quickly stopped when the subscriber terminal equipment is located where radio waves are received. Further, since stop information is added to the RAND field in the authentication vector, information for stopping can reliably be transmitted to the subscriber terminal equipment without being deleted or converted while converting a quintet into a triplet even if communication passes through a network based on GSM (Global System for Mobile Communications) and that based on IMT (International Mobile Telecommunication)-2000 due, for example, to roaming.

A subscriber authentication module in the present invention is one to be mounted in a subscriber terminal equipment, and comprises: a stop information receiving unit for receiving stop information for causing part or all of functions of the subscriber authentication module to stop included in a RAND field of an authentication vector used for authenticating the subscriber authentication module of a mobile communication network; and a stopping unit for stopping part or all of functions in the subscriber authentication module based on the stop information received by the stop information receiving unit.

According to the present invention, part or all of functions of a subscriber authentication module can be caused to stop based on stop information after receiving the stop information for causing part or all of functions of the subscriber authentication module, the stop information being written in the RAND field of an authentication vector.

Functions set in the authentication vector can thereby be quickly stopped in the subscriber terminal equipment if a location registration request can be made, that is, if the subscriber terminal equipment is located where radio waves are received. Also, function stop processing can be performed based on the stop information for stopping the functions set to the RAND field of the authentication vector and the stop information can reliably be extracted to stop the functions without being deleted or converted while converting a quintet into a triplet even if communication passes through a network based on GSM (Global System for Mobile Communications) and that based on IMT (International Mobile Telecommunication)-2000 due, for example, to roaming.

A mobile communication system in the present invention is one that comprises an authentication device for authenticating a subscriber authentication module, an authentication vector generating device for generating an authentication vector including a RAND field in response to a request from the authentication device and transmitting the generated authentication vector to the authentication device, and the subscriber authentication module mounted in a subscriber terminal equipment, wherein the authentication vector generating device; includes: a setting unit for making a setting to an effect that part or all of functions of the subscriber authentication module mounted in the subscriber terminal equipment should be caused to stop based on settings of an operator operating the authentication vector generating device; a request accepting unit for accepting an issue request of an authentication vector from the authentication device for authenticating the subscriber authentication module via the subscriber terminal equipment set by the setting unit; an authentication vector generating unit for generating an authentication vector for authenticating the subscriber authentication module mounted in the subscriber terminal equipment after an issue request of an authentication vector is accepted by the request accepting unit; an addition unit for adding stop information instructing to cause part or all of functions of the subscriber authentication module to stop to the RAND field of the authentication vector generated by the authentication vector generating unit when the setting unit makes a setting to the effect that the functions of the subscriber authentication module should be caused to stop; and an authentication vector transmitting unit for transmitting the authentication vector to which the stop information is added by the addition unit to the authentication device, and wherein the subscriber authentication module; includes: a stop information receiving unit for receiving stop information included in the RAND field of the authentication vector transmitted by the authentication vector transmitting unit; and a stopping unit for stopping part or all of functions in the subscriber authentication module based on the stop information received by the stop information receiving unit.

An authentication vector is thereby generated quickly in accordance with a location registration request from a subscriber terminal equipment such as a mobile terminal and, therefore, the functions can quickly be caused to stop if the subscriber terminal equipment is located where radio waves are received. Further, since the stop information is added to the RAND field in the authentication vector, information for stopping the functions can reliably be transmitted to the subscriber terminal equipment without being deleted or converted while converting a quintet into a triplet even if communication passes through a network based on GSM and that based on IMT-2000 due, for example, to roaming.

Functions set in an authentication vector can be quickly stopped in the subscriber terminal equipment if a location registration request can be made, that is, if the subscriber terminal equipment is located where radio waves are received. Also, function stop processing can be performed based on the stop information for stopping the functions set to the RAND field of the authentication vector and information for stopping can reliably be extracted to stop the functions without being deleted or converted while converting a quintet into a triplet even if communication passes through a network based on GSM (Global System for Mobile Communications) and that based on IMT (International Mobile Telecommunication)-2000 due, for example, to roaming.

According to the present invention, when subscriber terminal equipment is located where radio waves are received, functions thereof can quickly be caused to stop. If a subscriber module is mounted in the subscriber terminal equipment, functions thereof can quickly be stopped based on an authentication vector.

DESCRIPTION OF THE PREFERRED EMBODIMENTS

The present invention can be understood easily by considering detailed descriptions below with reference to attached drawings for exemplification. Subsequently, an embodiment of the present invention will be described with reference to attached drawings. The same numerals are attached to the same components if possible to omit duplicate descriptions.

Figure 1:
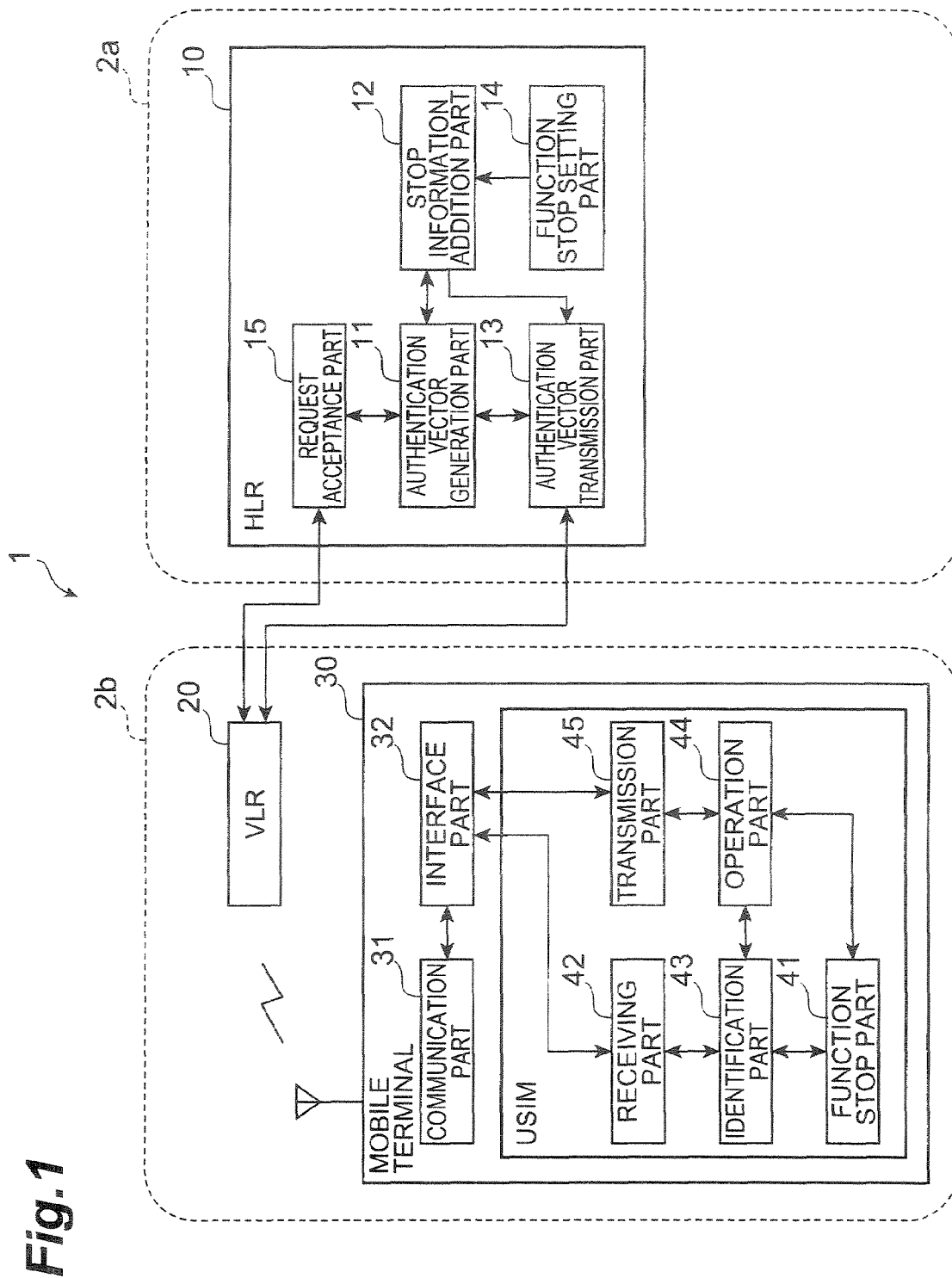
FIG. 1 is a diagram illustrating a configuration of a mobile communication system according to the present embodiment.

FIG. 1 shows a configuration of a mobile communication system 1 including a mobile terminal 30 in which an HLR10 (Home Location Register: authentication vector generating device), a VLR 20 (Visitor Location Register: authentication device), and a USIM 40 (User Subscriber Identity Module: subscriber authentication module) according to the present embodiment are mounted. In the mobile communication system 1, a mobile communication network 2 exists for each network operator. If, in the mobile communication system 1, the mobile terminal 30 is not located within communication areas of a mobile communication network of a network operator to which a subscriber of the mobile terminal 30 subscribes, but is located within communication areas (for example, within areas authenticated by the VLR 20) of a mobile communication network of another network operator, communication can still be performed via the another network. That is, roaming is possible in the mobile communication system 1.

In the present embodiment, it is assumed that a mobile communication network 2a is a mobile communication network of a network operator to which a subscriber of the mobile terminal 30 subscribes (hereinafter, this mobile communication network is referred to as a home network 2a) and a mobile communication network 2b is a mobile communication network of another network operator (hereinafter, this mobile communication network is referred to as a roaming network 2b). It is also assumed that the home network 2a is a network based on IMT-2000 and, for example, a network in Japan, and the roaming network 2b is a network based on GSM and, for example, an overseas network. Each component of the mobile communication system 1 will be described below assuming that the mobile terminal 30 communicates with the home network 2a via the roaming network 2b based on GSM in overseas.

The HLR10 is a device for generating an authentication vector (AV) used for authenticating a subscriber authentication module of a mobile communication network and exists in each mobile communication network 2. An HLR of the mobile communication network 2a is assumed to be the HLR 10. As shown in FIG. 1, the HLR 10 includes an authentication vector generation part 11 (authentication vector generating unit), a stop information addition part 12 (adding unit) instructing to cause part or all of functions in the subscriber authentication module to stop, an authentication vector transmission part 13 (authentication vector transmitting unit), a function stop setting part 14 (setting unit), and a request acceptance part 15 (request accepting unit).

Figure 2:
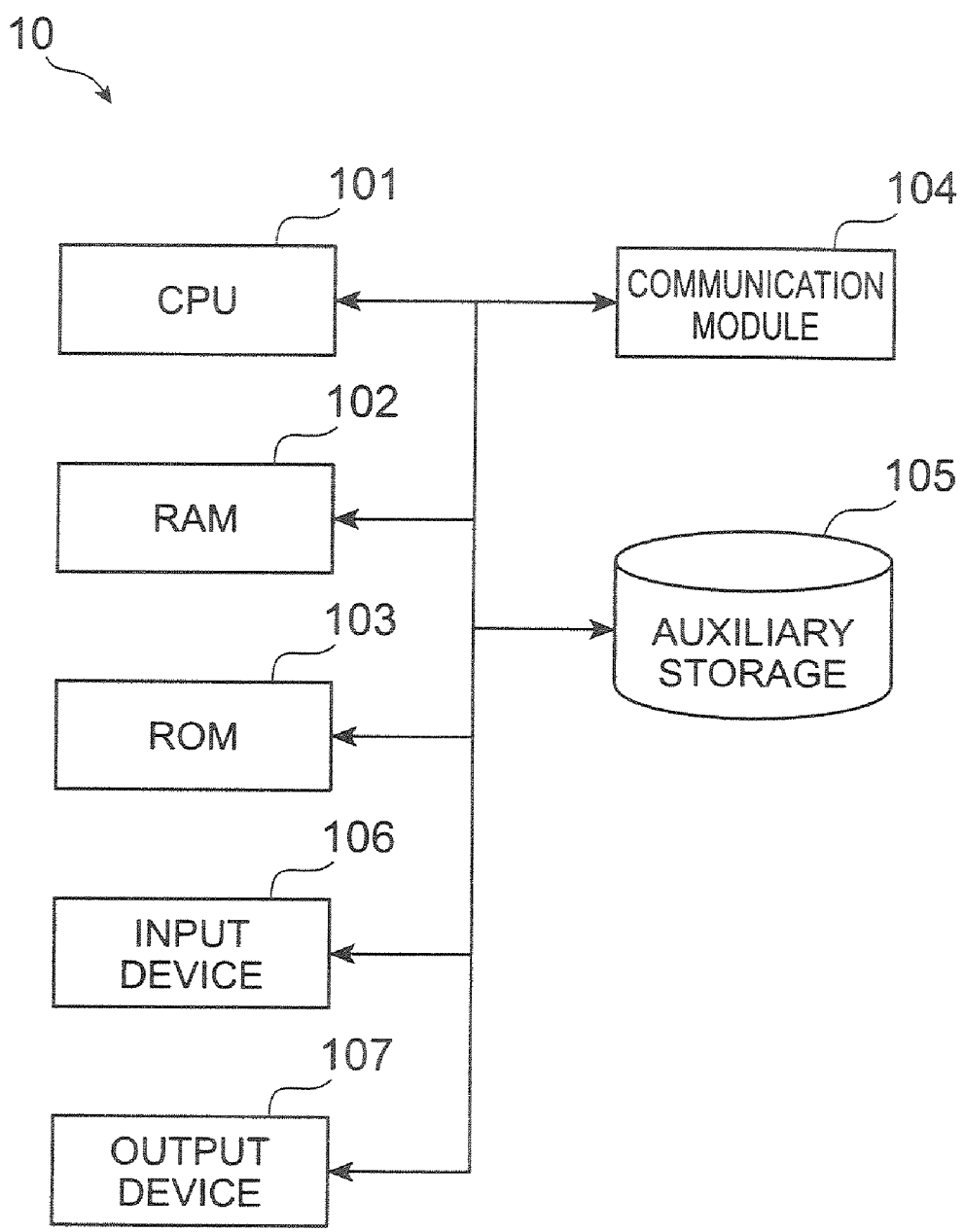
FIG. 2 is a hardware block diagram of HLR.

More specifically, the HLR 10 is preferably realized by an information processing device including a CPU, a memory, and the like. FIG. 2 is a hardware configuration diagram of the HLR 10. As shown in FIG. 2, the HLR 10 is physically configured as a computer system including a CPU 101, a RAM 102 and a ROM 103, which are main storage devices, an auxiliary storage 105, such as a hard disk, an input device 106, such as a keyboard and mouse, which are input devices, an output device 107 such as a display, and a communication module 104, which is a data transmitting/receiving device such as a network card. Each function described in FIG. 1 is realized by operating the communication module 104, the input device 106, and the output device 107 under control of the CPU 101 and also performing read and write operations of data in the RAM 102 and the auxiliary storage 105 by causing hardware such as the CPU 101 and the RAM 102 shown in FIG. 2 to read computer software. Each component will be described below based on a functional block shown in FIG. 1.

The authentication vector generation part 11 is a part that generates an authentication vector used for authentication of a subscriber authentication module. An authentication vector is generated by generating electronic data having a plurality of fields. For example, the authentication vector generation part 11 generates an authentication vector consisting of data rows shown in FIG. 3(a). FIG. 3(a) is a schematic view showing an authentication vector based on IMT-2000. As shown in FIG. 3(a), the authentication vector based on IMT-2000 consists of data rows called a quintet. More specifically, an authentication vector of a quintet is shown as data rows consisting of RAND, XRES, CK, IK, and AUTN. Of these data rows, the RAND field is a portion where random numbers for authentication processing are written, and further in the present embodiment, stop information for causing the function of the USIM 40 to stop is written.

Here, an authentication vector generated by the HLR 10 of the home network 2a, that is, an authentication vector generated for authenticating a subscriber authentication module owning the USIM 40 will be described. Since the home network 2a is a mobile communication network based on IMT-2000, an authentication vector generated by the HLR 10 of the home network 2a is a quintet having five fields of RAND, XRES, CK, IK, and AUTN as shown in FIG. 3(a).

A more specific description will be given below. The XRFS field contains information for verifying operation results carried out by the USIM 40. The information is preferably determined by confidential information and algorithms known only to the HLR 10 and the USIM 40 of a verification target. The CK field contains information for hiding radio channels. The IK field contains information for verifying contents of radio communication. The AUTN field contains information for authenticating the mobile communication network 2 in the USIM 40. Information for identifying the algorithm used for operations for authenticating a quintet is contained in the AMF field included in the AUTN field. When authentication is performed by the VLR 20 of the roaming network 2b, the quintet may be converted into a triplet in some cases (See FIG. 3(b)). Conversion content will be described later.

The stop information addition part 12 is a part that adds stop information in the USIM 40 to the RAND field of an authentication vector after reading the authentication vector generated by the authentication vector generation part 11 when location registration processing for the mobile terminal 30 set by the function stop setting part 14 is performed. The authentication vector generated by the authentication vector generation part 11 and to which stop information is added by the stop information addition part 12 is output to the authentication vector transmission part 13.

The authentication vector transmission part 13 transmits the authentication vector to which stop information has been added by the stop information addition part 12 to the VLR 20.

The function stop setting part 14 is a part that accepts a setting instruction by an operator of the HLR 10 from a control desk called a console (not shown) connected to the HLR 10 and makes a setting thereof. More specifically, the function stop setting part 14 is a part that accepts an instruction to stop part or all of functions of the USIM 40 itself identified by the USIM 40 and makes a setting thereof. In addition to accepting an instruction by an operator from the console, a setting to stop part or all of functions of the USIM 40 itself identified by the USIM 40 through a remote operation via a communication network from a user of the mobile terminal 30 may be accepted and stored.

The request acceptance part 15 is a part that accepts a request of an authentication vector from the VLR 20 via a communication part 31 and an interface part 32 of the subscriber terminal equipment. After accepting the request of an authentication vector, the request acceptance part 15 outputs an instruction for generating an authentication vector to the authentication vector generation part 11.

The VLR 20 is a device for managing and storing the location of the mobile terminal 30 and uses an authentication vector generated by the HLR 10 to perform actual authentication processing for the mobile terminal 30 and USIM 40. The VLR 20 also exists in each mobile communication network 2 and, if the mobile terminal 30 is connected to the home network 2a by roaming via the roaming network 2b, authentication processing is performed by the VLR 20 of the roaming network 2b. Concrete authentication processing in the VLR 20 will be described later.

The mobile terminal 30 is a device used by a subscriber of a mobile communication network to perform communication in the mobile communication system 1. The communication here corresponds, for example, to voice communication, packet communication and the like. As shown in FIG. 1, the mobile terminal 30 includes the communication part 31 having a mobile communication function and the interface part 32 that performs transmission/reception of information to the USIM 40.

The USIM 40 is a device mounted in the mobile terminal 30 to carry out operations necessary for authentication of a subscriber authentication module performed by the VLR 20. The USIM 40 is more specifically realized by an IC card mountable to the mobile terminal 30, and preferably stores information about a phone number of a subscriber and a network operator to which the subscriber subscribes. As shown in FIG. 1, the USIM 40 includes a function stop part 41 (stopping unit) executing to cause part or all of functions of the subscriber authentication module to stop, a receiving part 42 (stop information receiving unit), an identification part 43, an operation part 44, and a transmission part 45.

The function stop part 41 is a functional part to disable, for example, a function for referring to telephone directory information stored inside the USIM 40 from outside and also a function for referring to a portion in which other information that can be individually set by the user is stored, that is, to stop reference from outside. In addition, the function stop part 41 may also disable network connection using the USIM 40 by stopping all functions (a state in which no response is received) included in the USIM 40, disabling authentication operations, or deleting and resetting information stored in the USIM 40 itself after making a resetting to request input of the PIN code.

The receiving part 42 is a part for receiving data used for operation or that for a function stop from the interface part 32 of the mobile terminal 30. Data transmitted from the mobile terminal 30 contains at least information of the RAND field of an authentication vector. The received data is transmitted to the identification part 43.

The identification part 43 is a part that identifies stop information in the function stop part 41 by referring to the stop information contained in the RAND field of an authentication vector in the received data. If the identification part 43 identifies the stop information, the information is output to the function stop part 41 to cause a functional stop.

The operation part 44 is a part that carries out operations for authentication using the received data. Information of an operation result is transmitted to the transmission part 45 for transmission to the mobile terminal 30.

The transmission part 45 is a part that transmits information of an operation result after performing an operation to the mobile terminal 30. The mobile terminal 30 can determine whether or not authentication processing has been completed based on the operation result transmitted by the transmission part 45.

Figure 4:
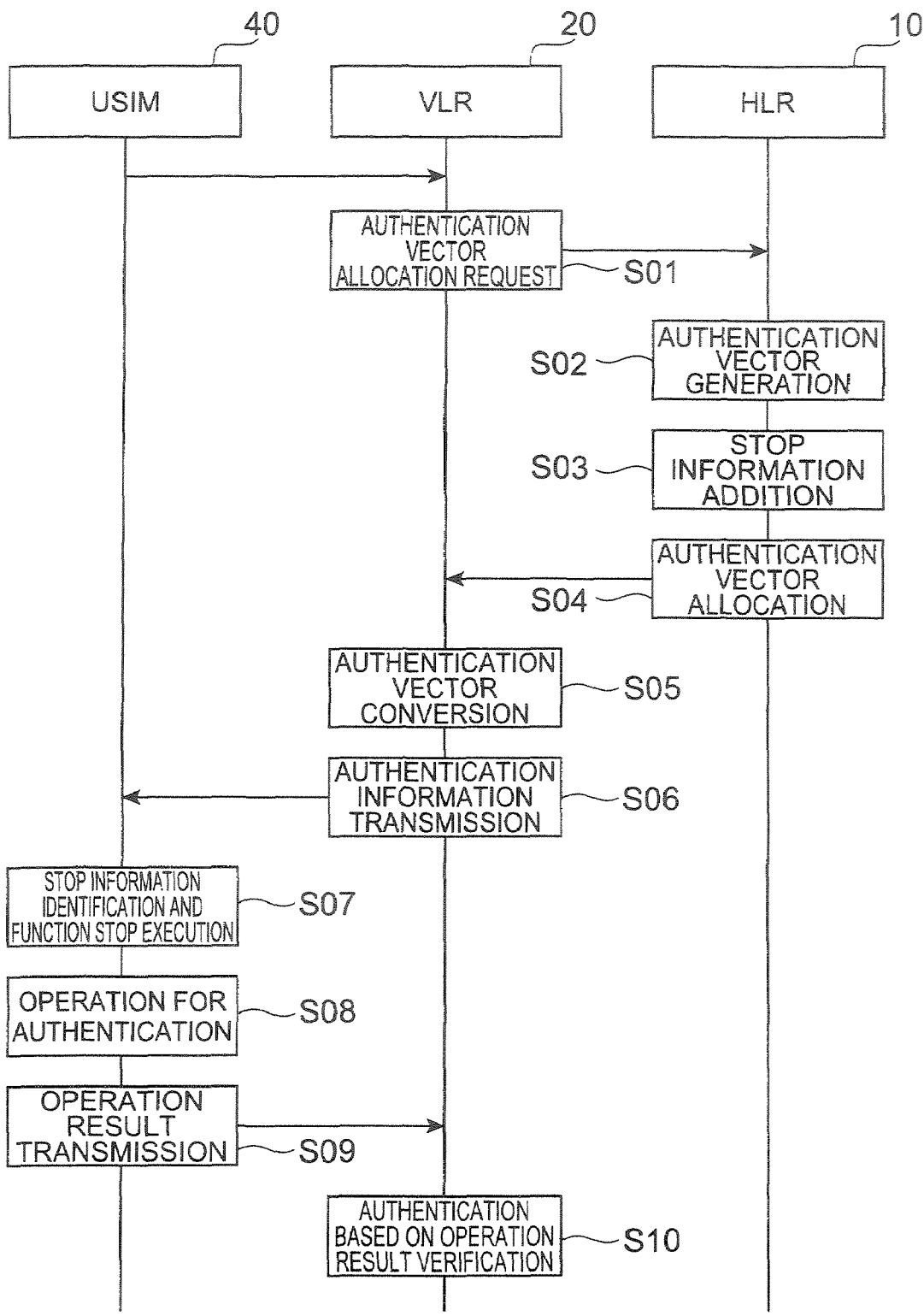
FIG. 4 is a sequence diagram illustrating processing performed in the mobile communication system according to the present embodiment.

Processing performed by the mobile communication system 1 in the present embodiment will be described below with reference to a sequence diagram shown in FIG. 4. The present processing is a process to authenticate the USIM 40 performed when the mobile terminal 30 is located within a communication area (for example, a foreign country in which a network based on GSM is set up) of the roaming network 2b and location registration is performed.

First, a request of location registration is transmitted from the mobile terminal 30 mounting the USIM 40, and the VLR 20 of the roaming network 2b managing an area where the mobile terminal 30 is located receives the request. Then, in accordance with the location registration request from the mobile terminal 30, the VLR 20 transmits an allocation request of an authentication vector for authenticating the USIM 40 to the HLR 10 of the home network 2a (S01). It is assumed in the present embodiment that a network operator to which the subscriber of the mobile terminal 30 (USIM 40) subscribes provides communication services to areas managed by the HLR 10.

The authentication vector generation part 11 in the HLR 10, which has received the allocation request, generates an authentication vector corresponding to the USIM 40 based on information identifying the USIM 40 contained in the allocation request (S02). Since the home network 2a is based on IMT-2000, as described above, the generated authentication vector is a quintet.

Information in the XRES field of the generated authentication vector is usually obtained from random number information contained in the RAND field and confidential information corresponding to the USIM 40 held in advance by the HLR 10 as a result of operation based on a predetermined algorithm. The predetermined algorithm is an algorithm used for operation of authentication by the USIM 40.

Figure 3:
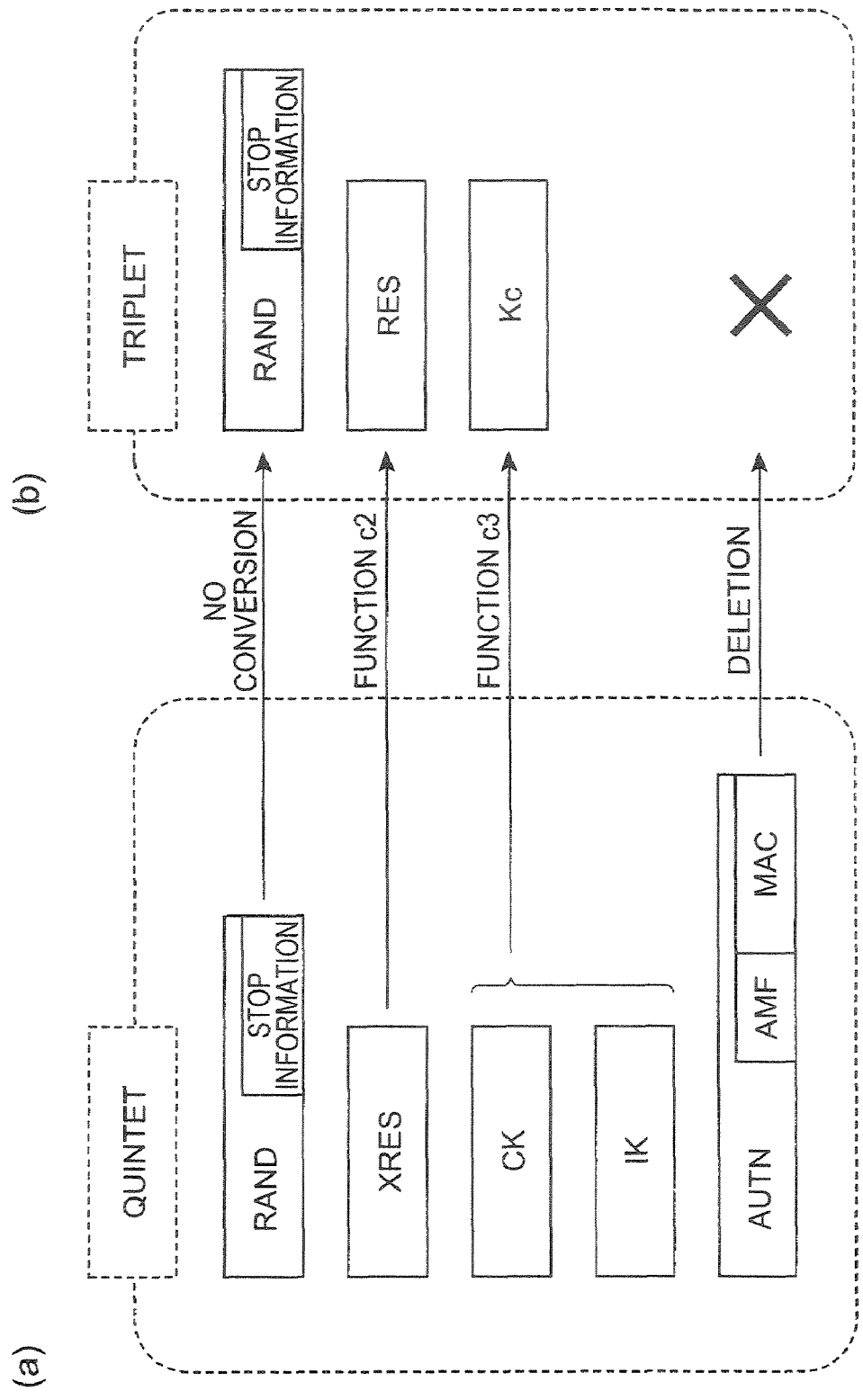
FIG. 3 is a diagram illustrating the configuration of a quintet and a triplet and conversion from the quintet to the triplet.

Subsequently, in the HLR 10, the stop information addition part 12 adds stop information to the RAND field of the generated authentication vector (S03). More specifically, as shown in FIG. 3, it is preferable to provide a stop information field of a predetermined data length, which is a field for identifying stop information, in the RAND field and to contain a character string identifying stop information in this stop information field. At this time, character strings are brought into correspondence with each other in advance, for example, a string "00h" is assumed to be stop information and other strings are not contained in stop information.

Since the RAND field needs to contain random number information that should originally be contained in this field, a field for identifying the algorithm should be kept to a minimum. Information for identifying the algorithm may be encrypted by some technique or in plain text.

Generation of an authentication vector (S02) and addition of stop information (S03) are separate processing in the above description of the present embodiment, but generation of an authentication vector and addition of stop information may be performed in single processing.

The generated authentication vector is transmitted by the authentication vector transmission part 13, and an allocation of the authentication vector is issued. That is, the authentication vector transmission part 13 transmits the authentication vector to the VLR 20 that issued an allocation request of an authentication vector (S04). The VLR 20 receives the transmitted authentication vector. The authentication vector is a quintet, but the roaming network 2b is a network based on GSM and uses a triplet for authentication and thus the VLR 20 converts the quintet into a triplet (S05).

More specifically, this conversion is performed as shown in FIG. 3. As shown in FIG. 3, data in the RAND field becomes data in the RAND field of a triplet without undergoing any conversion. Data in the XRES field becomes data in the RES field of the triplet after conversion by a predetermined function c2. Data in the CK and IK fields become data in a Kc field of the triplet after conversion by a predetermined function c3. Data in the AUTN field is deleted during conversion to the triplet. Since information for identifying stop information is contained in the RAND field that is not converted by any function, the information is inherited as it is.

The above conversion to a triplet is performed by the VLR 20, but in some mobile communication systems, conversion to a triplet is performed by the HLR 10 before transmission to the VLR 20.

Subsequently, the VLR 20 transmits information for authentication to the USIM 40 (S06). The information for authentication contains at least information in the RAND field. The transmission is performed via base stations (not shown) and the communication part 31 and interface part 32 of the mobile terminal 30.

Subsequently, in the USIM 40, the receiving part 42 receives information for authentication transmitted from the mobile terminal 30, that is, data used for operation for authentication. After the data is received by the receiving part 42, the identification part 43 reads the data. The identification part 43 refers to stop information contained in the RAND field and outputs an instruction to stop functions to the function stop part 41. After receiving the instruction, the function stop part 41 stops part or all of functions of the USIM (S07). More specifically, identification of stop information is preferably performed by reading a character string in the RAND field and using correspondence information between the character string and a character string held in advance.

Subsequently, the operation part 44 carries out an operation for authentication based on a predetermined algorithm (S08). An operation result is transmitted to the transmission part 45, and the transmission part 45 transmits the operation result to the mobile terminal 30. The transmitted operation result is transmitted to the VLR 20 via the communication part 31 of the mobile terminal 30 and base stations (S09). After receiving the operation result, the VLR 20 uses information for authentication contained in the XRES field of an authentication vector to verify whether or not the operation result is valid to authenticate the USIM 40 (S10). More specifically, the verification is performed by determining whether a value contained in the XRES field and that of the operation result are the same.

By performing the above operation processing for authentication and authentication processing thereof, processing for location registration can normally be terminated, but if functions are stopped including processing thereafter (processing of S08 and thereafter), the USIM 40 can safely omit processing of S08 and thereafter.

Thus, according to the present embodiment, stop information is identified before stopping functions even if the roaming network 2b is a network based on GSM. Therefore, functions of the USIM 40 can still be stopped when the mobile terminal 30 is in a roaming network.

Points where modifications are needed in the present embodiment from a conventional mobile communication system include a generation process of an authentication vector of the HLR 10 (S02 and S03 in FIG. 4) and a stop process based on stop information of the USIM 40 (S07 in FIG. 4) only and the VLR 20 needs no modification at all, and therefore, the present embodiment can be realized readily.

The above embodiment assumes that roaming occurs between a network based on IMT-2000 and that based on GSM, and a technology of the present invention can also be applied for authentication in a GSM network. That is, in a GSM network, the HLR inserts information for identification of stop information in a subscriber authentication module (called SIM (Subscriber Identity Module) in GSM) into the RAND field of a triplet. The above processing enables realization of a function stop even in GSM that does not assume a function stop in terms of specification.

To realize the above function stop, the USIM 40 must perform an authentication operation. Thus, it is preferable to perform a function accompanied by an authentication operation such as an incoming operation on subscriber information of the USIM 40 from a home network.

Next, operation effects of the mobile communication system in the present embodiment will be described. According to the HLR 10 in the present embodiment, a setting is made to the effect that part or all of functions of the USIM 40 should be caused to stop based on an instruction from an operator operating the HLR 10 or a user who has lost the mobile terminal 30. Then, a request of an authentication vector from the VLR 20 whose location registration has been performed from the set mobile terminal 30 is accepted, an authentication vector for authenticating the USIM 40 in the mobile terminal 30 is generated, stop information instructing to cause part or all of functions of the USIM 40 to stop is added to the RAND field of the generated authentication vector so that the authentication vector to which the stop information is added can be transmitted to the VLR 20.

An authentication vector for stopping functions is thereby generated in accordance with a location registration request from the subscriber terminal equipment such as the mobile terminal 30 and, therefore, the functions can be quickly stopped when the mobile terminal 30 is located where radio waves are received. Further, since stop information is added to the RAND field in the authentication vector, information for stopping can reliably be transmitted to the mobile terminal 30 without being deleted or converted while converting a quintet into a triplet even if communication passes through a network based on GSM and that based on IMT-2000 due, for example, to roaming.

The USIM 40 in the present invention receives stop information written in the RAND field of an authentication vector to cause part or all of functions of the USIM 40 to stop and, based on the stop information contained in the received authentication vector, part or all of functions of the USIM 40 or part or all of functions of the mobile terminal 30 can be caused to stop.

Functions set in the authentication vector can thereby be quickly stopped in the mobile terminal 30 if a location registration request can be made, that is, if the mobile terminal 30 is located where radio waves are received. Also, function stop processing can be performed based on stop information for stopping the functions set to the RAND field of the authentication vector and stop information can reliably be extracted to stop the functions without being deleted or converted while converting a quintet into a triplet even if communication passes through a network based on GSM and that based on IMT-2000 due, for example, to roaming.

What is claimed is:

1. An authentication vector generating device for generating an authentication vector including a RAND field in response to a request from an authentication device for authenticating a subscriber authentication module and transmitting the generated authentication vector to the authentication device; comprising:

a setting unit configured to make a setting indicating that part or all of functions of the subscriber authentication module mounted in a subscriber terminal equipment should be caused to stop based on an input received from an operator operating the authentication vector generating device;

a request accepting unit configured to accept an issue request of the authentication vector for authenticating the subscriber authentication module via the subscriber terminal equipment;

an authentication vector generating unit configured to generate the authentication vector for authenticating the subscriber authentication module mounted in the subscriber terminal equipment after the issue request of the authentication vector is accepted by the request accepting unit, the authentication vector including the RAND field where a random number is written for authentication processing;

an addition unit configured to add stop information to the RAND field of the authentication vector, the stop information being a character string separate from the random number stored in the random number field and being an instruction which causes part or all of functions of the subscriber authentication module to stop, when the setting unit makes the setting indicating that part or all of the functions of the subscriber authentication module should be caused to stop, such that the RAND field of the authentication vector includes both a portion for the random number for authentication processing and a portion for the stop information; and an authentication vector transmitting unit configured to transmit the authentication vector, to which the stop information is added by the addition unit, to the authentication device.

2. The authentication vector generating device according to claim 1, wherein the authentication vector is based on a IMT (International Mobile Telecommunication)-2000 network.

3. The authentication vector generating device according to claim 1, wherein the authentication vector that is transmitted to the authentication device is a triplet authentication vector.

4. The authentication vector generating device according to claim 3, wherein the triplet authentication vector is based on a GSM (Global System for Mobile Communications) network.

5. The authentication vector generating device according to claim 1, wherein the authentication vector generating device is configured to convert the authentication vector from a quintet authentication vector to a triplet authentication vector prior to transmitting the authentication vector to the authentication device.

6. A mobile communication system comprising an authentication device for authenticating a subscriber authentication module, an authentication vector generating device for generating an authentication vector including a RAND field in response to a request from the authentication device and transmitting the generated authentication vector to the authentication device, and the subscriber authentication module mounted in a subscriber terminal equipment, wherein the authentication vector generating device; includes:

a setting unit configured to make a setting indicating that part or all of functions of the subscriber authentication module mounted in a subscriber terminal equipment should be caused to stop based on an input received from an operator operating the authentication vector generating device;

a request accepting unit configured to accept an issue request of the authentication vector from the authentication device for authenticating the subscriber authentication module via the subscriber terminal equipment set by the setting unit;

an authentication vector generating unit configured to generate the authentication vector for authenticating the subscriber authentication module mounted in the subscriber terminal equipment after the issue request of the authentication vector is accepted by the request accepting unit, the authentication vector including the RAND field where a random number is written for authentication processing;

an addition unit configured to add stop information to the RAND field of the authentication vector, the stop information being a character string separate from the random number stored in the random number field and being an instruction which causes part or all of functions of the subscriber authentication module to stop, when the setting unit makes the setting indicating that part or all of the functions of the subscriber authentication module should be caused to stop, such that the RAND field of the authentication vector includes both a portion for the random number for authentication processing and a portion for the stop information; and an authentication vector transmitting unit configured to transmit the authentication vector, to which the stop information is added by the addition unit, to the authentication device, and wherein the subscriber authentication module includes:

a stop information receiving unit configured to receive stop information included in the RAND field of the authentication vector transmitted by the authentication vector transmitting unit; and a stopping unit configured to stop part or all of functions in the subscriber authentication module based on the stop information received by the stop information receiving unit.

7. A method, implemented on an authentication vector generating device, of generating an authentication vector including a RAND field in response to a request from an authentication device authenticating a subscriber authentication module and transmitting the generated authentication vector to the authentication device; comprising:

a setting step of making a setting indicating that part or all of functions of the subscriber authentication module mounted in the subscriber terminal equipment should be caused to stop based an input received from an operator operating the authentication vector generating device;

an accepting step of accepting an issue request of the authentication vector from the authentication device for authenticating the subscriber authentication module via the subscriber terminal equipment set by the setting step;

an authentication vector generating step of generating the authentication vector for authenticating the subscriber authentication module in the subscriber terminal equipment after the issue request of the authentication vector is accepted by the accepting step, the authentication vector including the RAND field where a random number is written for authentication processing;

an addition step of adding stop information to the RAND field of the authentication vector, the stop information being a character string separate from the random number stored in the random number field and being an instruction which causes part or all of functions of the subscriber authentication module to stop, when the setting step makes the setting indicating that part or all of the functions of the subscriber authentication module should be caused to stop, such that the RAND field of the authentication vector includes both a portion for the random number for authentication processing and a portion for the stop information; and a transmitting step of transmitting the authentication vector, to which the stop information is added by the addition step, to the authentication device.

* * * * *